US007124167B1

(12) United States Patent
Bellotti et al.

(10) Patent No.: US 7,124,167 B1
(45) Date of Patent: Oct. 17, 2006

(54) COMPUTER BASED SYSTEM FOR DIRECTING COMMUNICATIONS OVER ELECTRONIC NETWORKS

(76) Inventors: Alberto Bellotti, 44 Brookside Ave., Hawthorne, NJ (US) 07506; Shahidul Khan, 140 Minnisink Rd., Totowa, NJ (US) 07512

( * ) Notice: Subject to any disclaimer, the term of this patent is extended or adjusted under 35 U.S.C. 154(b) by 758 days.

(21) Appl. No.: 09/765,092

(22) Filed: Jan. 17, 2001

Related U.S. Application Data

(60) Provisional application No. 60/176,970, filed on Jan. 19, 2000.

(51) Int. Cl.
G06F 15/16 (2006.01)

(52) U.S. Cl. ............... 709/206; 709/202; 709/203; 709/228; 709/238; 455/414; 455/461; 370/351

(58) Field of Classification Search ........ 709/200–203, 709/205–206, 227–228, 246, 238–239; 455/412–417, 455/445, 461; 370/351–356
See application file for complete search history.

(56) References Cited

U.S. PATENT DOCUMENTS

| 5,434,797 | A | | 7/1995 | Barris ................. 709/204 |
|---|---|---|---|---|
| 5,572,677 | A | | 11/1996 | Luther et al. ............... 709/206 |
| 5,742,905 | A | * | 4/1998 | Pepe et al. .................. 455/461 |
| 5,928,325 | A | * | 7/1999 | Shaughnessy et al. ...... 709/206 |
| 5,963,217 | A | | 10/1999 | Grayson et al. ............ 345/473 |
| 5,974,446 | A | * | 10/1999 | Sonnenreich et al. ....... 709/203 |
| 6,154,782 | A | * | 11/2000 | Kawaguchi et al. ........ 709/203 |
| 6,212,550 | B1 | * | 4/2001 | Segur ......................... 709/206 |
| 6,301,609 | B1 | * | 10/2001 | Aravamudan et al. ...... 709/206 |
| 6,356,533 | B1 | * | 3/2002 | Bruno et al. ................ 370/252 |
| 6,459,776 | B1 | * | 10/2002 | Aktas et al. ............. 379/88.13 |
| 6,484,027 | B1 | * | 11/2002 | Mauney et al. ............. 455/421 |
| 6,603,755 | B1 | * | 8/2003 | Parker ....................... 370/342 |
| 6,614,892 | B1 | * | 9/2003 | Hashimoto et al. .... 379/100.14 |
| 6,717,936 | B1 | * | 4/2004 | Srinivasan .................. 370/352 |

* cited by examiner

Primary Examiner—Bharat Barot
(74) Attorney, Agent, or Firm—Hoffman & Baron, LLP

(57) ABSTRACT

The present invention includes a system and method for communicating across an electronic communication network. The present invention permits a user of the electronic communication network to communicate with one or more other users of the electronic communication network. The software employed in such a system and method permits a user to select one or more individuals to whom communication is desired and/or one or more terminals to which communication is desired, enter a message, and send the message. The recipient or recipients of the message are defined on the network and are selectable at the sender's terminal through a graphical user interface (GUI).

59 Claims, 13 Drawing Sheets

COMPUTER BASED SYSTEM FOR DIRECTING COMMUNICATIONS OVER ELECTRONIC NETWORKS

This application claims priority from U.S. Provisional Application No. 60/176,970, entitled "SYSTEMS AND METHODS FOR COMPUTER-AIDED COMMUNICATIONS USING ELECTRONIC NETWORKS", and filed on Jan. 19, 2000.

FIELD OF THE INVENTION

The present invention relates to systems and methods for communicating across an electronic communication network. More particularly, the present invention relates to an intercom system which permits a user at one user node on the network to communicate with one or more users at other nodes on the network.

BACKGROUND OF RELATED TECHNOLOGY

Communications within particular places, such as within office environments, more specifically dental offices, medical offices, or law offices, have traditionally occurred through the use of intercom or telephonic systems. Typically, such systems allow an individual to "beep" or otherwise alert another individual who is located in a different part of the office that the one individual wishes to speak to the other individual. The other individual can then respond and the individuals converse. Such systems may also include the ability for an individual to broadcast a message to an entire office such that the message is heard from all or less than all of the other intercom devices attached to the system, such as when one individual desires to page another individual who is not present at a known location.

Such inter-office communication systems typically require a hard-wiring of all the intercom devices present on the system in order to function. Alternatively, such devices may be wireless, although this typically results in greater cost of the system. Also, certain of these systems require extensive amounts of equipment such as speakers placed throughout the office in order for broadcast communications to occur.

Certain systems which allow for such intercom functionality also exist in traditional telephonic systems where, for example, a receptionist is able to speak to a user in a particular office or may broadcast a message to all telephone devices in the office. Telephonic systems with such capability are typically more expensive than telephonic systems without such capability and are often undesired in offices where individuals do not wish to be disturbed with the constant interruption of voice broadcast messages. As such, the limited functionality, intrusiveness, and considerable cost associated with traditional intercom systems does not make them attractive to many offices where inter-office communications are desirable.

The advent of electronic communication networks, such as computer networks, in office environments in recent years has provided a new mechanism for inter-office communications. Such networks include, for example, local area networks and Intranets. Additionally, wide area networks, Internets, and Extranets may be used by offices for inter-office communications, particularly in situations where a company has offices in different geographic locations. These networks typically require a great deal of equipment, including one or more servers, numerous terminals, and hardware and software to connect all the elements of the network. Consequently, establishing such networks often results in a great deal of expense. Once such expense has been incurred, it is desirable to provide as much functionality to such networks in order to maximize their benefit.

Messaging software is known which permits a first user at one terminal on such a computing network to send a message to a second user at another terminal on the network such that the message appears on the second user's screen. For example, Microsoft® Corporation provides pop-up messaging software with its network operating systems which accomplish such tasks. Such messaging systems are limited in their usefulness, however, as they are of limited functionality and the message recipient must be present at her terminal in order to see the message and must be looking at the monitor attached to the terminal in order to read the message.

Additionally, it is known to communicate across computer networks using voice communications. For example, certain devices, commonly referred to as Internet phones, exist which allow a user who is connected to the Internet to speak to another user who is also connected to the Internet using a microphone or other similar device attached to a computer. The second user is able to hear the first user through a speaker attached to the second user's computer. In this same way, the second user can then speak into a microphone and is heard through the speaker at the first user's computer. Additionally, it is known to use such devices over local area networks. For example, U.S. Pat. No. 5,434,797 to Barris, and U.S. Pat. No. 5,572,677 to Luther et al., disclose the transmission of digital audio files over local area networks for communication between workstations on the network.

While these devices permit voice communications across a network, they are limited to direct communication between individuals at two Internet Protocol addresses. Further, such devices have the undesirable characteristic of transmitting relatively large streams of audio data across a network. As such, they are generally transmitted across networks at speeds slower than that of smaller data streams, such as text, and often cause congestion on such networks. Typically, audio data sent over such networks, especially low bandwidth networks, results in poor quality audio at the recipient's terminal. Higher bandwidth networks, while better at transmitting such data, can nonetheless quickly grind to a halt when numerous and large data streams are transmitted thereon.

Previous attempts at communication across electronic networks have to date been largely inadequate. As stated above, known means for communicating across electronic networks are of limited usefulness. Systems which allow a user to communicate audibly with another user are limited to one-to-one communications and require prohibitively large audio data streams. Other systems which allow a first user to send a message to a second user located at a different terminal on the network require the second user to be at the terminal and to view the message on the terminal's monitor. Such systems provide limited functionality.

Therefore, there exists a need for a system and method of communicating in a manner similar to that employing traditional intercom systems which can use existing electronic communication networks, therefore obviating the need for the additional expense and effort associated with establishing such an intercom system. There further exists a need for such a system and method which allows for reliable communications among multiple users on such a network. Still further, there exists a need for a system and method for accomplishing these goals in an efficient manner. The present invention is directed towards meeting these and other needs.

SUMMARY OF THE INVENTION

The present invention includes a system and method for communicating across an electronic communication network. The present invention permits a user of the electronic communication network to communicate with one or more other users of the electronic communication network. The software employed in such a system and method permits a user to select one or more individuals to whom communication is desired and/or one or more terminals to which communication is desired, enter a message, and send the message. The recipient or recipients of the message are defined on the network and are selectable at the sender's terminal through a graphical user interface (GUI).

Once the message arrives at the intended recipient's terminal, the message is not only displayed, but also may be spoken as a result of a text-to-speech converter. The system of the present invention consequently offers the functionality of a traditional intercom system without the effort and expense associated with installing the hardware required for such an intercom system. It further allows for the functionality of a traditional intercom system without the expense associated with maintaining such a system and the space requirements of the hardware needed for such a system.

Further, as the system of the present invention is capable of working over existing electronic networks, it provides an efficient means for establishing an intercom system which takes advantage of an existing network without the need for investing in the installation of a second communications network, as is required for traditional intercom systems. Still further, as the system and method of the present invention employs software running on a computing system, such a system and method is capable of extensive functionality not seen in traditional intercom systems.

The present invention is intended as an inter-office communication tool utilizing computers in a local area network as a means of intercom. It is a server based application where a dedicated server (computer) is a mediator for sending/receiving messages as well as keeping track of intercom station configurations, messages and users. Each office computer running the system is seen as and operates as an intercom station. Upon activation of the software, the application automatically minimizes to the system tray. The main graphical user interface (GUI) is arranged to contain receive and send message sections. By pressing Expand/Hide button, the send section of the main GUI can be hidden or expanded. This feature gives user the flexibility to hide the send section and therefore the user can have more screen space available to them for using other applications. When a message is sent to an intercom station, the message receive section is displayed and if the message scroll option is not enabled otherwise, the message scroll window pops up across the top of the screen.

A default option of enabling a message scroller is enabled by default. Upon receiving new messages, the message scroller appears on the top area of the screen scrolling the new message at a user selectable speed. When this option is enabled, only the message scroller is shown, scrolling the new message from right to left. The message-viewing window of the application is not shown. Upon hiding the scroller, the message-viewing window gets displayed and could then be hidden upon the user's request.

Another included feature is text to speech conversion. This ability allows text messages sent between stations to be spoken by the receiving station. This feature can be enabled or disabled by the user. Furthermore, different voices can be selected. When enabled, messages are spoken right before being displayed in the scroller and the message-viewing window.

All parameters, messages, stations are user configurable. Parameters that define the office environment are only configurable from the server. These parameters include:
  number of configured stations;
  system names (TCP/IP) of the stations;
  station group names as seen on the GUI (currently supporting 4 groups of 10 stations each);
  captions of those systems as seen on the application;
  standard messages that are selectable from a list; and
  user names and passwords.

Parameters for the three configurable broadcast message buttons are also user configurable. Those include:
  whether the programmable broadcast message button is enabled;
  the message itself; and
  the caption on the button.

Enabling or disabling showing an icon instead of the text caption is also contemplated with icons being initially installed with the application on all stations.

Upon the start-up of the application on each station, all parameters are downloaded from the server to the starting station. Users can also chose to selectively download these initialization parameters at any time while the application is running. This is useful when new parameters are added or some are modified on the server, i.e. users added, stations renamed, etc.

Some parameters are stored with each station. These define the features that user(s) may have enabled or disabled individually. These parameters include:
  sound to play upon receipt of a normal message;
  sound to play upon receipt of a broadcast message;
  sound to play upon receipt of a private message;
  whether the scrolling window is enabled;
  the speed of text scrolling on the scrolling window;
  the color of the text being scrolled on the scrolling window;
  whether text to speech is enabled or not; and
  the system name of the server.

Depending on the system the application is running on, the main menu options to modify parameters may or may not be disabled. If the application is the server copy, the main menu options to modify the parameters as specified in the first bullet list are enabled. While on a client station, those options will be grayed out.

The computer aided intercom and paging system via inter-office computer networking offers the following features:
  using voice over IP as used in an intercom manner;
  visual communication between each intercom station;
  paging users;
  multi-user access to private messages without restarting application;
  from any intercom station, ability to obtain user login status on all intercom stations;
  from any intercom station, ability to detect other intercom stations in operation;
  support of two different messages type (i.e., normal and private);
  normal messages, and broadcast messages can be sent without specifying intended user;

large messages scrolling for easy viewing;
persistent private messages;
private message notification/indicator;
message acknowledgement;
message reply;
user defined custom system configurations;
priority message sending;
group/group of station message sending;
automatic period update of the list of all systems on the network and system configuration; and
basic speech recognition functions.

DETAILED DESCRIPTION OF THE INVENTION

Figure 1:
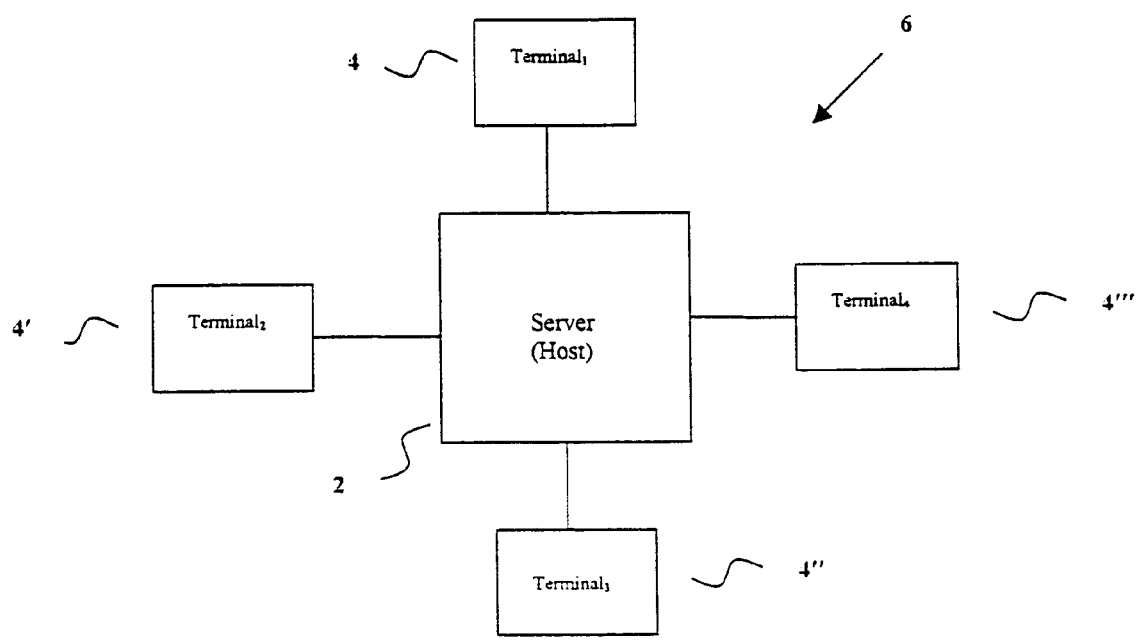
FIG. 1 is a schematic of a networked environment showing a host server and terminals.

One of ordinary skill in the art will recognize that systems and methods according to the present invention can be practiced using any conventional electronic network, which may be any electronic environment that allows communications between computing devices and/or computing access devices of any sort. For example, an electronic network which may be employed in the present invention includes, but is not limited to, a local area network, a wide area networks, an Internet Protocol Network, an Intranet, a private network such as a peer-to-peer network or a client-server network, a cable network, a satellite network, the World Wide Web, or any other publicly or privately available network. Computing devices and computing access devices which may be used as a server or terminal in an electronic network in the present invention include, but are not limited to, personal computers, touch sensitive screens, web TV, touch-tone telephones, personal digital systems, dumb terminals, Java virtual machines, or any other electronic communication device.

The following is an example of the interaction of certain components of the present invention to achieve communication over an electronic network.

An electronic computing network, desirably a local area network, is enabled with the technology of the present invention with an installation. The technology of the present invention is desirably implemented as a Win32 (Windows 95®, Windows 98®, Windows NT®, Windows 2000®) application which is executed and run as an application in the system tray. The application starts automatically upon logging onto Windows from the Startup folder. The installation includes at least one server-based application which will serve as a mediator for sending and receiving messages between terminals on the network and one or more terminal-based applications which communicate with the server-based application as well as with other terminal-based applications. Desirably, the terminal-based software and the server-based software of the present invention are the same.

As such, a system of the present invention can be conveniently provided to an enterprise employing such a system without the need for different applications for the both the server and the terminals. Further, this allows for additional terminals to be readily added to the network subsequent to installation of the system. A user can configure any intercom station on the network to be a server-based application of the present invention by selecting the appropriate configuration settings in the application. Once configured, the software is then capable of the functioning as the server-based application of the present invention capable of performing numerous functions including, but not limited to, keeping track of intercom station configurations, storing and retrieving messages, private message notification, and registering and tracking users.

Subsequent to installation, the server-based and terminal-based applications of the present invention interact so as to permit users of the network to communicate from individual terminals. Terminals on the network are identified by the server in a known manner, such as through the use of an Internet Protocol address, computer network node name, or other identifier. A computer network node name is defined in a host file used by an operating system on the terminal for identification of the terminal on the network. The technology of the present invention desirably utilizes these identifiers in order to recognize the individual terminals connected to the network and to interact therewith.

Associated with the identifier for an individual terminal, for example, may also be the name of the room in which the terminal is located, the department in which the terminal is located, or the typical user or group of users of that terminal. In this manner, the technology of the present invention is capable of readily and automatically configuring the installed software to function without duplicating previous efforts in configuring each terminal to communicate with the server and other terminals on the network. Alternatively, the technology of the present invention may be manually configured to recognize individual terminals connected to the network.

Once the server-based application has been configured to recognize and communicate with the terminal-based applications, the system is functional. A user at a terminal on the network activates the software in a known manner, such as by double-clicking on an icon associated with the software. Upon activation of the software, the application is desirably removed from view such as by automatically minimizing itself to the system tray, desktop, or taskbar, in order to remain unobtrusive when not receiving or sending messages. The terminal-based application desirably includes a GUI which allows the user to easily access and utilize the functionality of the application including, but not limited to, selecting the recipient or recipients for a message, typing in a message to be sent or selecting a pre-defined message to be sent, selecting the type of message to be sent such as normal or private, reviewing received messages, logging into the system, and configuring various attributes of the software such as coloration, fonts, speech, and other options.

All system parameters, messages, and stations are configurable in the present invention. Parameters that define the office environment are desirably only configurable from the server-based application. These parameters include, but are not limited to: number of configured stations; system names (TCP/IP) of the stations; station group names as seen on the GUI; captions of those systems as seen on the application; standard messages that are selectable from a list; user names and passwords; and parameters for the broadcast messaging buttons, including whether the programmable broadcast message button is enabled, the message itself, the caption on the button, and enabling or disabling showing an icon instead of the text caption (icons are desirably initially installed with the application on all stations).

Upon the start-up of the application on each station, all these parameters are desirably downloaded from the server to the starting station. Users can also chose to selectively download these initialization parameters at any time while the application is running. This is useful when new parameters are added or some are modified on the server (i.e., users added, stations renamed).

Some parameters are desirably stored with each station. These define the features that user(s) may have enabled or disabled individually. These parameters include: sound to play upon receipt of a normal message; sound to play upon receipt of a broadcast message; sound to play upon receipt of a private message; whether the scrolling window is enabled; the speed of text scrolling on the scrolling window; the color of the text being scrolled on the scrolling window; whether text to speech is enabled or not; and the system name of the server.

Depending on the system the application is running on, the main menu options to modify parameters may or may not be disabled. If the application is the server copy, the main menu options to modify the parameters as specified above are desirably enabled. While on a client station, those options will desirably be grayed out.

In a typical use, a user at a terminal on the network running a terminal-based application of the present invention desires to send a message to another user or terminal on the network, maximizes the software if minimized, logs onto the system if not previously done, types in her message or selects a predefined message to be sent, selects the user(s) and/or or terminal(s) to whom the message is to be sent, selects whether the message is to be sent in normal mode or private mode, in which case a password or other method of authentication will desirably be required to retrieve the message, and sends the message. After the message is sent, the software desirably is minimized, either by the user or automatically, and runs in the background. The system of the present invention is capable of allowing the user to send the message in a broadcast manner in which the message is sent to all terminals on the system.

As the user sending the message has logged onto the system, the software is capable of automatically configuring the user's message with the terminal and/or user's identification information which the recipient may see. The software is also capable of automatically configuring the message with the current date and time, as well as with any other information the user wishes to automatically appear on a message which she sends.

In one aspect of the invention, a user may send a message in a normal mode such that the message will appear at the desired terminal(s) for viewing by any individual(s) who are present at the terminal. Alternatively, the message may be sent in normal mode such that it is directed to a particular user or group of users who are logged into the system. In such a case, any terminal(s) into which such user(s) are logged in will receive the message.

In another aspect of the invention, a user may send a message in private mode to one or more terminals such that the message will appear at the desired terminal or terminals but will not be automatically displayed thereat. Rather, a message or other indicator will appear notifying a user at such terminal that a private message is waiting. Desirably, retrieval of such a message will require a password. This functionality is, for example, desired where, in a medical environment, a message is sent to an X-ray room and the sender desires that only the X-ray technicians who work at that terminal have access to the message.

Alternatively, a user may send a message in private mode to one or more particular user of the system, such that the message notification will appear at any terminal(s) on the network into which the desired recipient(s) are logged in. The actual message will not automatically appear at such terminal(s), but rather a message or other indicator, i.e., a red light and/or scrolling message notification which will be read aloud if text-to-speech capabilities are enabled, will appear notifying the intended recipient that a private message is waiting. This user may then retrieve his message by, for example, entering a password which permits the user to view the message. Desirably, when a message is sent in private mode, an indicator on the GUI of the terminal-based application receiving the message which simulates a blinking light may alert the user to whom the private message is addressed that the message is available for retrieval.

In a desired aspect of the present invention, the text which appears at a message recipient's terminal may be converted to speech. In such a configuration, the recipient need not be viewing the terminal in order to be alerted to the fact that a message has been received or in order to know what the message says. This is also desirable as it allows for greater flexibility in placement of the terminal as the user need not be located directly at the terminal in order to get messages. Further, a message sent to a terminal proximate to several persons will be able to alert all such persons of the message without any of them having to be present at the terminal. In such a way, the present invention provides the functionality of a conventional intercom system over existing electronic networks and, in fact, offers significantly greater intercom functionality as the system is effectuated by software under user control.

For example, unlike a conventional intercom system, a terminal-based application used in the present invention may be configured to convert all, or less than all of received text messages to speech. The application may be configured, for example, to convert only those text messages to speech that are marked as high importance by the sender or may be configured by the user to enable text-to-speech conversion for all messages. This priority message sending capability desirably allows for the automatic enabling (if disabled) of the text-to-speech capabilities of the recipient terminal-based software where the prioritized message is displayed. Subsequently, the text-to-speech capability can be restored to its disabled state.

As such, again with reference to a medical environment, a laboratory, for example, will not be constantly interrupted with messages, but will only be interrupted by those requiring immediate attention. Those messages of lesser importance will be available for viewing at the terminal at the convenience of those in the laboratory. As another example, users working in a room at different times may desire to hear a different voice utilized in the intercom. As such, the voice may be customized in a variety of ways to suit the individual desires of such users. In a conventional intercom system, all users are required to hear the same voice, that of the message sender, and are unable to filter calls based on importance, thereby resulting in constant interruptions.

Once a message has been received, the recipient can desirably acknowledge the message and respond to the sender in a manner similar to the way in which the message was sent. The terminal-based software desirably includes an acknowledge and a reply button or other means for responding which provides an efficient manner for the recipient to reply to the sender.

Desirably, when a message is received, only the portion of the GUI dedicated to receiving messages appears at the receiving terminal and the message is displayed in a text box. This portion of the GUI contains the means for the recipient to easily acknowledge and/or reply to the message. Alternatively, it is desired that when a text scrolling capability of the present invention is enabled, a received message will only appear at a particular place on the receiving terminal and will scroll across the display. As the text scrolls, it is desirably converted to speech if the text-to-speech capabilities of the present invention are enabled.

Means are provided for easily clearing and/or acknowledging the received message. If the recipient wishes to quickly acknowledge the message, that user can select that user's name from a drop down list, select the message to be acknowledged, and optionally, type in an additional message. Means are further provided for readily changing the options associated with the scrolling text as well as for hiding the scrolling text. If more than one message is received in the text scroller, the messages are desirably displayed in the order in which they are received. Any number of messages may appear in the text scroller, although a user will typically set a limit as to the number of messages that may scroll in order to avoid the confusion that may result from an excessive number of messages. When a user acknowledges a message, that message will desirably be removed from the scroller of other recipients of that message. However, the message may be configured by the sender or by the user who is acknowledging such that it is not removed from the scoller of other recipients.

Turning to FIG. 1, a centralized server 2, which serves as a host/control center, is connected to terminals 4, 4', 4", and 4'" to define an electronic network 6. For the purposes of illustration, four terminals 4, 4', 4", and 4'" are attached to server 2. In operation, any desired number of terminals could be connected to the network 6 through server 2. Additionally, one of ordinary skill in the art will recognize that more than one server could be utilized in network 6.

Server 2 is enabled with the technology of the present invention by installing an application of the present invention thereon. This application is then configured to function as the server-based application which is capable of the functions set forth above. Terminals 4, 4', 4", and 4'" each are enabled with the technology of the present invention by installing an application of the present invention thereon. The application installed on terminals 4, 4', 4", and 4'" is desirably the same as that installed on server 2. These applications are then configured to function as the terminal-based applications of the present invention. Desirably, each of the server 2 and terminals 4, 4', 4", and 4'" are of conventional hardware design and include processing circuitry, storage, a display, speakers, and a keyboard. The processing circuitry typically includes a microprocessor, video/graphics circuitry, audio processing circuitry, and input/output circuitry. Storage typically includes high-speed semiconductor memory, such as dynamic random access memory and static random access memory, along with non-volatile memory, such as compact disk read only memory, digital versatile disk, hard drives, floppy drives, magneto-optical drives, and other fixed or removable media.

Figure 2:
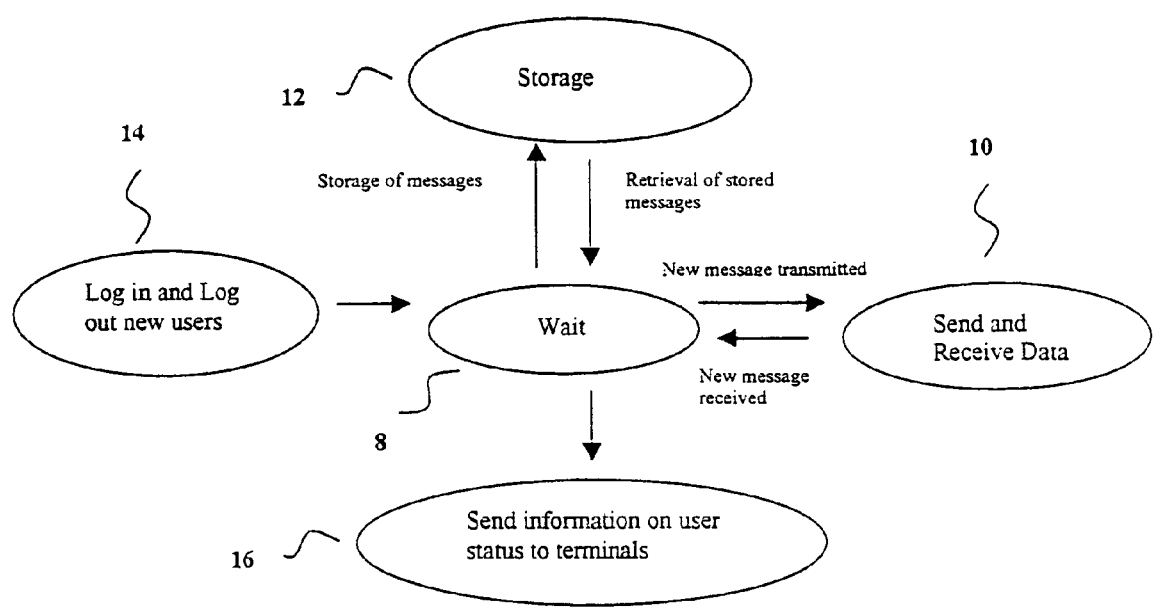
FIG. 2 illustrates a state diagram describing operation of a server-based application.

FIG. 2 diagrammatically shows the operation of the server (host) 2 in the present invention. In state 8, the server-based application is in a wait state, where it is waiting for a communication from a terminal-based application. Desirably, in state 8, the server-based application continuously monitors all terminal-based applications which are part of the system for a data transmission, such as when the server-based application and the terminal-based applications are in bi-directional communication.

When a message is sent from a terminal-based application by a user operating such application at a terminal 4, 4', 4", or 4'", the server-based application shifts to state 10, where the server 2 receives the message and then transmits the message to the appropriate terminal 4, 4', 4", and/or 4'" based on the intended user(s) and/or terminal(s) recipient information entered by the sender. At the time the server-base application transmits the message to the intended recipient, it also desirably enters state 12, where it stores the message in the server 2. Desirably, messages sent in private mode are stored at the server 2 while messages sent in normal mode are not stored at the server 2 but rather reside only at the target intercom station. However, all messages sent (i.e., those sent in normal mode as well as those sent in private mode) could be stored at the server 2.

This private message is desirably stored in an encrypted format. In a desired aspect of the present invention, messages sent in normal mode do not go through the server-based application, but rather are sent point-to-point from one terminal 4, 4', 4", or 4'" to one or more other terminals on the network 6. In alternative aspects of the present invention, messages may be stored at the terminal 4, 4', 4", and/or 4'" in addition to, or in place of, the message being stored at the server 2. In state 12, the server-based application is also capable of retrieving messages which are stored on the server 2, such as when a user logs on, is informed that a private message is waiting, and/or sends a request queue to view the private message.

If a private message is sent from a user to one or more additional users who are not logged onto the system at the time the message is sent, that message may be stored, desirably in an encrypted format, on the server 2 by the server-based application in state 12 and made available to the intended recipient user(s) at a later time when the user(s) log onto the system. In such a case, the server-based application in state 12 retrieves the stored message from the server 2 where the message is store, for example, on a hard disk or removable media included in server 2 and transmits the message to a terminal-based application located on terminals 4, 4', 4", and/or 4'" where such user(s) are located. Desirably, private messages can only be deleted by the intended recipient. Further, in the case where private messages are stored on the server-based application, when the recipient of such messages logs out of the system, all such private messages are deleted from the permanent or temporary memory of the individual terminal 4, 4', 4", or 4'" and remain on the server 2 for later retrieval and/or deletion.

The server-based application of the present invention also performs many functions in addition to the transmittal, storage, and retrieval of messages. For example, when a user who is registered on the server-based application logs onto the system using a terminal-based application of the present invention, the server-based application shifts to state 14 and such logon is recognized and authenticated by the server-based application. Once this recognition occurs, the server 2 may shift to state 16 and desirably transmits such information to the other terminal-based applications of the present invention which are running on the network. As such, a user at a terminal 4, 4', 4", or 4'" running such terminal-based application will be able to readily identify that the other user is now logged onto the system. In an alternative aspect of the present invention, the server 2 stores this login information in the server-based application such that a request from a terminal-based application for information regarding users who are logged onto the system will then cause the server-based application to shift to state 16 and transmit information regarding the user logon status including the newly logged-in user as such.

Further, when a user logs off of the system, the server-based application shifts to state 14 and recognizes this logoff. As with login information, the server-based application then shifts to state 16 and is capable of transmitting this information to the terminal-based applications or making such information available to such terminal-based applications upon request. The present invention provides for a variety of means of identifying the users and terminals which are actively part of the system. For instance, if a user wishes to obtain the login status or connectivity of other uses or other terminals, respectively, on the system, that user can find out from any terminal 4, 4', 4", or 4'" which users are presently logged onto the system and which terminal or terminals such user are logged onto.

Alternatively, the user can obtain a list of all terminals and see who is logged onto each of those terminals. As the user is able to obtain such detailed information regarding the status of users and terminals on the system, that user is able to make informed decisions regarding to whom and to where that user's messages should be directed. This ability renders the intercom system of the present invention inherently more efficient and functional than conventional voice intercom or computer messaging systems. While many uses of the server-based application of the present invention have been set forth, it will be apparent to one of ordinary skill in the art that the server-based application is capable of performing numerous additional functions.

Figure 3:
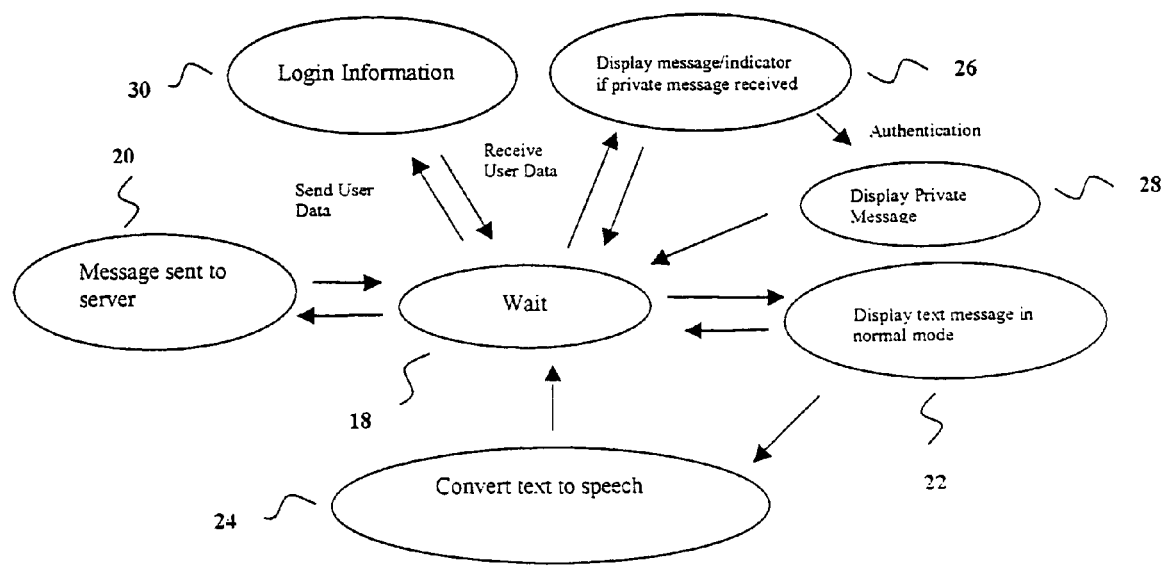
FIG. 3 illustrates a state diagram describing operation of a terminal-based application.

FIG. 3 diagrammatically shows the operation of a terminal-based application of a system of the present invention. In state 18, the terminal-based application is in a wait mode. In this mode, the application is desirably running in the background and is minimized at the screen of the user's terminal so as to be unobtrusive. When a user at a terminal 4, 4', 4", or 4'" sends a message to one or more users or terminals on the system, the terminal-based application shifts to state 20 and the message is sent to the server-based application. Desirably, this occurs only with private messages, which are stored at the server 2, while messages sent in normal mode are sent point-to-point from one terminal on the network 6 to another target terminal on the network 6. Normal messages sent point-to-point are transmitted much faster by bypassing the software installed on the server 2. Such point-to-point communications desirably occur using a TCP/IP Network layer. However, all messages, both private and normal, can be sent from the terminal-based application to the server-based application. In addition to containing text to be viewed by the recipient, the message may also contain additional information such as configuration information which may effect the presentation of the message at the recipient's terminal, the time and date of the message, the name of the sender and identification information for the terminal from which the message was sent, as well as other information.

When a message is received at a terminal-based application of the present invention, the application shifts to state 22 and desirably automatically restores only the section of the application dedicated to receiving messages, such that the message can be viewed. If the terminal-based application receiving the message has been configured to activate the text-to-speech capability of the present invention, then the application shifts to state 24 and the text is converted to speech based on the configuration specified. Desirably, the text message will be displayed on the screen and converted to speech substantially simultaneously. Alternatively, the message may be converted to speech and not shown as text, or the application may remain in state 22 and the message will appear as a text-only message. Such a configuration may be desirable where a user at a terminal does not wish to be disturbed. If the terminal-based application has a text scrolling feature of the present invention enabled, the received message will desirably only be displayed as scrolling text at the receiving terminal(s) and converted to speech if the text-to-speech function is enabled. In any case, when the user maximizes the GUI, all received messages can be viewed in a text box dedicated to displaying received messages.

The present invention converts text to speech through the use of a text-to-speech processor. As stated previously, the use of a text-to-speech processor is advantageous as it allows relatively small data, i.e., command and control and text data, to be transmitted over a network where it is subsequently converted to speech, thereby allowing for faster data transfer than that of audio data. This command and control data contains instructions regarding the manner in which the accompanying text is to be converted to speech. Additionally, the speech that is ultimately heard on the receiving end is clear, unbroken, and customizable. The transmission of audio data, by contrast, is often inaudible, broken, and only available in the sender's voice. Further, there is no option for the receiver to see the message in text-only form, as is possible where the data is sent as text. While the use of text-to-speech processing is known in a network environment, its use has not been known in a system and method of the present invention.

For example, U.S. Pat. No. 5,963,217, herein incorporated by reference, discloses a system for providing animated avatars on a user's system which appear to "speak" text which is transmitted to the user's node by a host computer. The resulting voice that the user is effected by text-to-speech conversion software. The application of this technology in this reference is directed to chat room technology in which a user logs on to a host computer which is provided with centralized chat room software. Text sent from the user to the host is then transmitted from the host to other users who are also logged into the same chat session. This text appears in a centralized window which is viewed by all the individuals. The sender of the information does not specifically identify the other users to whom her message will be sent and the message is not sent directly to the other users, rather the text is sent directly to the software present at the host which is then viewed by others. Further, there is no acknowledgement that a sent message has been viewed by the other users. The other users may then also send text to the host computer in response to the messages of other users. This results in a running conversation wherein the messages of various users appear sequentially in the window which each user views at her terminal.

Any commercially-available text-to-speech conversion software may be used in the present invention. For example, Microsoft's® text-to-speech application program interface may be used. Additionally, SOFTVOICE by SoftVoice, Inc. is another program which translates text to speech and may be used in the present invention.

Turning again to FIG. 3, if a message that has been sent as a private message is received, the terminal-based application shifts to state 26. In this state, the application may indicate that a private message has been received through a variety of means which may be selected by the user. Such means include, but are not limited to, a message displayed at the terminal indicating that a private message has been received for a particular individual, a graphic which is meant to simulate a blinking light, an audio indicator, or a combination thereof. Desirably, an authentication means is required for the intended recipient to view the private message. If such authentication is required and the user's identity if authenticated, the terminal-based software will shift to state 28 and the message will be displayed at the message received section of the main application window.

In order for a message to be received by a particular terminal-based application, some identifier associated with that application must be associated with the message being sent in order for it to routed to that terminal-based application by the server-based application. For instance, as stated previously, the message being sent can be sent to a particular individual or group of individuals, to a particular terminal or group of terminals, to a combination thereof, or can be broadcast to all terminals which are part of the system. As such, turning again to a medical office environment, if individual A is a nurse, for example, and is working on terminal 4 where this individual is logged into the terminal-based application thereon, any messages sent from a doctor addressed to nurse A requesting nurse A's assistance will be routed to terminal 4 by the server-based application.

If nurse A then wishes to work at terminal 4', nurse A can logoff of terminal 4 and logon to terminal 4'. At this point, any messages addressed to nurse A will be automatically routed to terminal 4'. Further, nurse A does not have to logoff of terminal 4 prior to logging on to terminal 4', in which case the message will be routed to both terminals 4 and 4'. However, if terminal 4 is located, for example, in a nurses station and a doctor wishes to call that station to request any nurse, not necessarily nurse A, for assistance, then the doctor sending the message will address his message to terminal 4 itself. Similarly, in the manner set forth above, a private message could be sent to nurse A which that individual will receive at whatever terminal or terminals that user is logged into. If nurse A is not logged into the system at the time such private message is sent, then the message will be waiting for nurse A at whatever terminal nurse A logs into at a subsequent time.

Additionally, the present invention is well-suited for terminals which are frequented by multiple users. A terminal-based application of the present invention is capable of allowing a user to logoff and a different subsequent user to login without the need to reboot the terminal or to restart the application. Additionally, a terminal-based application of the present invention is able to receive data from the server-based application that a new user has been added to the system or that an existing user has logged in or logged out of the system without the need for restarting the application. When a new user is entered into the system or when an existing user logs in or out of the system, the terminal-based application enters state 30 and updates its user information accordingly. In the same manner, if a terminal is added to, or removed from the system of the present invention, then this information may be communicated from the server-based software to all terminal-based applications on the system so that such applications shift to state 30 and are updated accordingly. Again, this is capable of occurring without the need to restart the applications. Accordingly, from any intercom station on the system, a user has the ability to detect all other intercom stations which are in operation. Desirably, this occurs by performing a scan of all stations from the terminal-based application.

Figure 4:
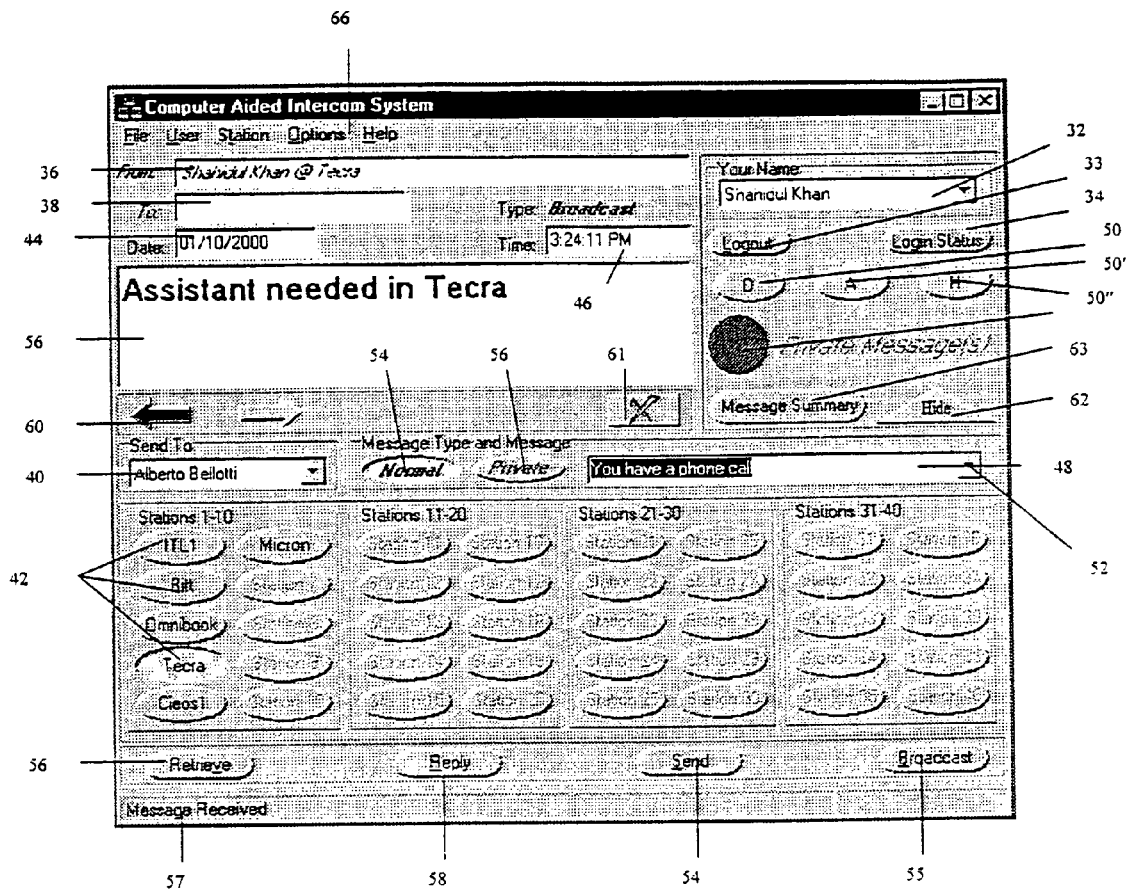
FIG. 4 shows a graphical user interface of a terminal-based application.
Figure 10:
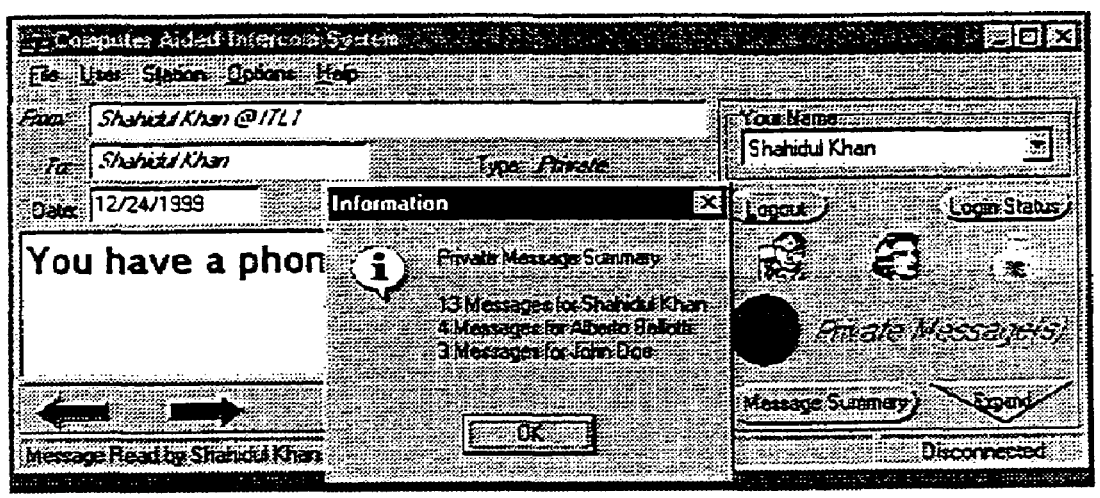
FIG. 10 shows the graphical user interface of FIG. 8 including a summary of private messages.

Turning to FIG. 4, a GUI of a terminal-based application of the present invention is shown. While not meant to be limiting in any way, FIG. 4 is illustrative of many desired aspects of the present invention. This Figure shows the software in an expanded mode, where all functions are available to the user. Having been registered as a user of the system at the server 2 through a server-based application of the present invention, the user logs into the system by selecting his or her name from a drop down menu 32. This menu 32 also allows the user to check the status of other users of the system by clicking on login status button 34. A logout button 33 is also provided which allows a user to quickly log out of the system. After clicking on button 34, a sub window is displayed with a list of all users currently logged onto the intercom system on the network, as shown in FIG. 10.

The GUI shown in FIG. 4 is designed such that a message recipient can easily see who sent the message and to whom the message was sent. When a message is received, the sender's identifier automatically appears in "from" box 36. "To" box 38 is also provided in which the identity of the recipient(s) appears. "Send to" menu 40 is automatically configured to display a list of users of the system, or may be configured to display only those users currently logged onto the system.

The terminal-based application is also capable of having pre-defined groups of users which may appear by name or other identifier on "send to" menu 40. For instance, once again in a medical environment, should the user wishing to send a message be a doctor who wishes to send a message, either in normal or private mode, to all nurses on the system, that doctor may configure the terminal-based application to show an identifier, for example, "nurses" in "send to" menu 40 such that when this group is selected, the doctor's message will be send to all users defined in this group. Alternatively, an administrator operating the server-based application can define these groups which may be automatically recognized by the terminal-based application and displayed on "send to" menu 40.

Further, the terminal-based application is capable of allowing the sender to select a single name from "send to" menu 40, click on a graphical "add" button (not shown) to add this user to the list of recipients, then select one or more additional names and add these one or more additional persons to the list of recipients as well in the same manner. Still further, the list of individuals appearing on "send to" menu 40 may be customized to identify individuals by any means the sender so desires. For example, the sender could configure the software to identify persons by their title, so that the president of the company could, rather than be identified by name, be identified on the send to menu as "President".

Further, as previously stated, the sender may chose to send a message to one or more terminals (stations) on the system, rather than direct the message to any particular individuals. As such, graphical station buttons 42 are provided as part of the GUI which allow the sender to quickly select one or more stations to which the message will be sent. FIG. 4 shows a GUI with forty programmable station buttons 42. However, the application is customizable such that any number of stations buttons may be included in the GUI depending on the needs and desires of the system users. Stations buttons 42 each represent an individual station on the system. Buttons representing groups of stations may also be provided so that the sender may quickly select a particular group of stations to which the message will be sent.

Turning again to a medical environment, if a doctor wishes, for example, to send a message to a particular nursing station in the office, a button may be labeled which identifies that station, allowing the doctor to quickly identify that station and send the message to it. Alternatively, if the doctor wishes to send the message to all the nursing stations in the office, a button may be labeled which identifies it as such, allowing the message to be sent to all the nursing stations by clicking on only one button. These buttons 42 can be labeled in any way the user so desires. The stations identified by these buttons 42 are desirably defined at the server-based application. The buttons on the terminal-based applications may be defined at the server-based application, which is desirable where it is desired that all terminal-based applications have the same buttons, or may be defined at the terminal-based applications, which is desirable where it is desired that each terminal-based application of the system has a different configuration. Where the buttons are defined at the server-based application and automatically configured at the terminal-based applications, they may, of course, be further customized at the terminal-based application.

Additionally, any combination of individuals, groups of individuals, stations, or groups of stations, may be selected by the sender as recipients of the message. As such, the system of the present invention allows a message to be seen and/or heard by only those persons whom need to hear it, without needlessly disturbing others in the office.

In addition to having the ability to automatically enter the sender's information into the outgoing message, the terminal-based application may also, without limitation, automatically enter the date 44, and the time 46. It will be clear to one of ordinary skill in the art that there are potentially limitless customizations of the terminal-based application as to the type of information that may automatically be inserted into the sender's outgoing message.

Figure 8:
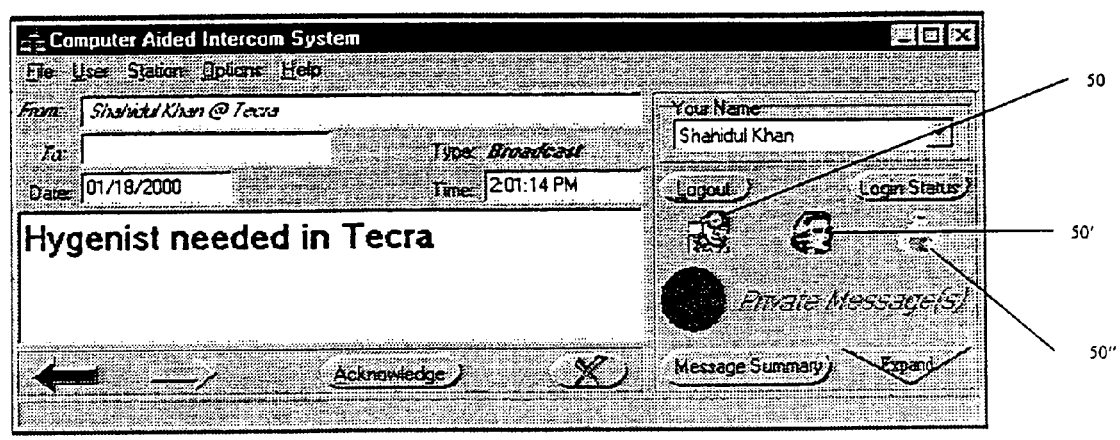
FIG. 8 shows the graphical user interface of FIG. 5 in which the broadcast buttons are in the form of graphical icons.

A text box 48 is provided into which the user types the message to be sent. Alternatively, a message which has been pre-defined can be inserted into the text box 48 by clicking on a button 50, 50', or 50" which has been programmed with the pre-defined message. Desirably, buttons 50, 50', and 50''' are used for broadcast messages, such that the sender can simply click on a single button to send a pre-defined message to all stations, or a defined number of station, on the system, without having to click on any additional buttons and without having to enter any additional information. This message is desirably be pre-defined at the server-based application and automatically recognized at the terminal-based application. A window (not shown) may also be present into which such a broadcast message will appear. As shown in FIG. 8, buttons 50, 50', and 50" may be in the form of graphical icons. The use of such icons allows the sender to quickly recognize the broadcast message which is associated with each button 50, 50', and 50". Additionally, if a graphic icon is not associated therewith, buttons 50, 50', and 50" may be identified by captions which can be recognized by the sender as being associated with a particular broadcast message. As set forth below, broadcast messages may also be sent by typing text into text box 48 and clicking on "broadcast" button 55.

By establishing these pre-defined messages at the terminal-based applications, such messages are fully customizable to meet the needs of the individual terminals. Additionally, such pre-defined message may be selected from a drop-down menu 52. The number of messages that are available to be selected from drop-down menu 52 are potentially limitless, and may be established at the server-based application, the terminal-based application, or may be provided with the software when it is purchased by the customer, having been customized by the system provider prior to installation. Any number of pre-defined messages may be established depending on the needs of the individual stations and of the enterprise operating the system.

The sender also selects the type of message which is being sent by clicking on "normal" button 54 or "private" button 56. When the user sends the message in normal mode, the message will be sent to the intended recipient user(s) and/or terminal(s) without any authentication required to view the message. As such, the message will appear at the appropriate terminal(s) and can be viewed by any individual present thereat. If the user sends the message in private mode, an authenticator, such as a password, is desirably required for the intended recipient to view the message. The application is desirably configured to have a default mode, such as normal, where the message will be sent in that mode unless otherwise specified.

Once a message has been entered, the recipient(s) identified, and the type of message specified, the sender clicks on a "send" button 54 to send the message to the intended recipient(s) or station(s). Alternatively, the sender clicks on a "broadcast" button 55 to send the message to all terminals on the system.

Figure 5:
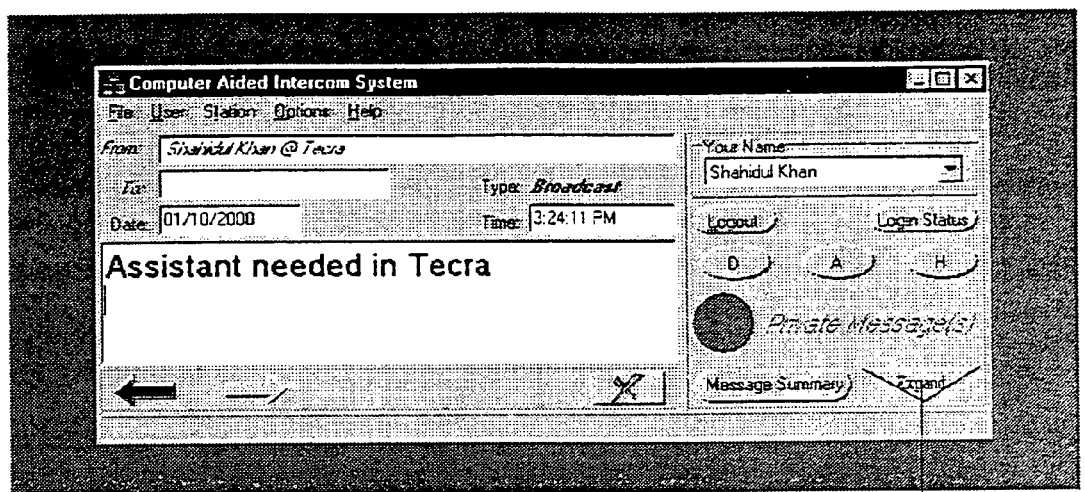
FIG. 5 shows a version of the graphical user interface of a terminal-based application of FIG. 4 in which a portion of the graphical user interface is hidden.

Referring to FIG. 5, when a message is received at the intended terminal(s) on the system, the message appears in message box 56 if sent in normal mode. If the message is sent in private mode, a graphical indicator 58 will alert the recipient that a private message is waiting. As stated above, a message may also appear in message scroller 67 (FIG. 6) stating that the intended recipient has a private message waiting. A private message may be retrieved by clicking on a "retrieve" button 56 and entering a proper authenticator, such as a password, when prompted. It is understood that other means of retrieving such a private message may be supplied, such as by clicking on the indicator itself. The GUI may also include additional features to alert the recipient that a message has been received, such as a "Message Received" message 57 appearing near the boarder of the GUI.

Further, additional messages may appear at the border of the GUI, as with message 57, for example, to indicate the success or failure of transmitting a broadcast message to all terminals on the system. As the broadcast message is sent to each terminal, a message appears, desirably in the lower right-hand corner of the GUI, indicating the success or failure of transmission to each station. Once the recipient views a received message, that user may reply to the sender by clicking on a "reply" button 58 which will automatically configure a message for that user to send back to the original sender. All the individual replying need do is type in his or her own message and click "send" button 54 to reply. Alternatively, a button (not shown) may be provided which allows the recipient to reply not only to the sender, but to all other recipients of the message. Such a feature is desirable, for example, where a request has been made for assistance and a user wishes to acknowledge the request and inform all others to whom the message was sent that that user will respond to the request.

Other features are provided which allow a user to manage received messages. For example, arrows 60 are provided which allow a user to quickly scroll through the list of messages which have been received. An "X" (delete) button 61 is provided which allows the user to quickly delete the message being displayed. A "message summary" button 63 is provided which allows the user to view information including, but not limited to, the total number of private messages received for that user and for other users, as seen in FIG. 10.

In order to minimize the obtrusiveness of the GUI, a button 62 is provided which allows the user to hide a portion of GUI. FIG. 4 shows an entire GUI of a terminal-based application, including the list of stations configured to receive messages on the system. In operation, however, a user may desire to only receive messages from other individuals, in which case clicking on "expand/hide" button 62 will cause the GUI to display only that information necessary for viewing messages which are received. Desirably, as seen in FIGS. 4 and 5, clicking on "expand" button 64 in FIG. 5 will cause the GUI to expand as shown in FIG. 4 and display that portion of the GUI necessary for sending messages.

Figure 6:
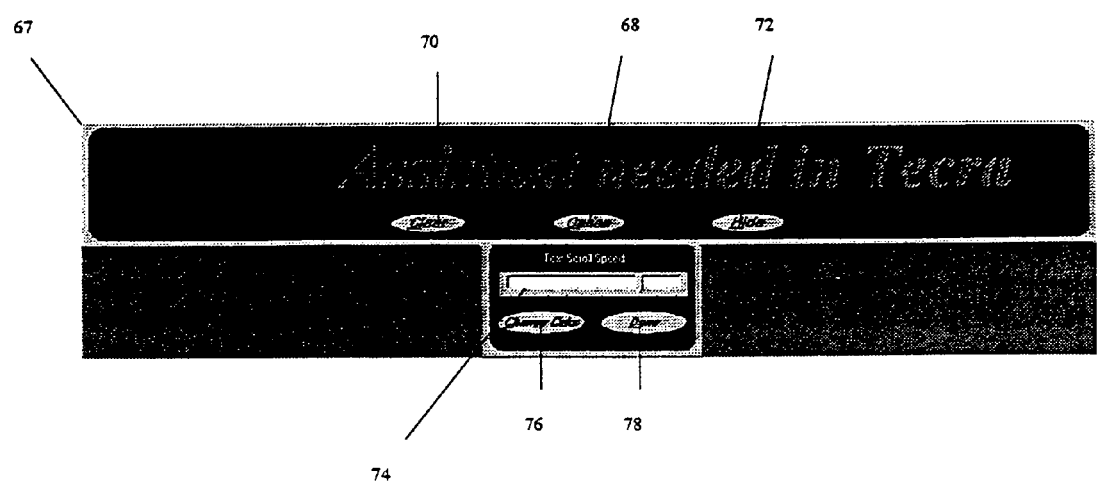
FIG. 6 shows a text scrolling feature of a terminal-based application when a message is received.

For example, in operation, the GUI will desirably be minimized while running in the background. When a message is received, the main GUI will either restore only the receiving section, as shown in FIG. 6, or scroll the message, as set forth below. Unless and until the user clicks on "expand" button 64, that portion of the GUI related to sending messages is hidden from view. The GUI at each terminal-based application is fully customizable such that the user can determine which elements of the GUI will be visible when "hide" button 62 is selected. When "hide" button 62 is selected and the GUI is altered to display only a portion of the available features, "hide" button 62 desirably changes to "expand" button 64 which, when clicked, will alter the GUI back to its original state, wherein all available features are displayed.

Figure 7:
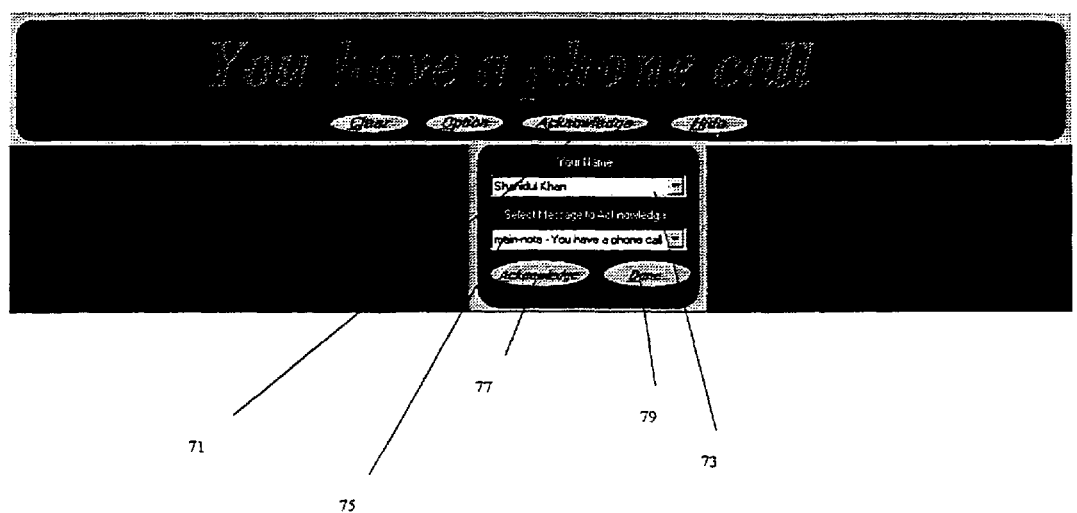
FIG. 7 shows the text scrolling feature of a terminal-based application which includes a means for acknowledging a received message.

Turning to FIGS. 6 and 7, when an intercom station of the present invention receives a message, it may be configured to scroll the received message 67 at the terminal display in addition to, or in place of, displaying the message in message box 56. Desirably, when the text scrolling feature is enabled, the a received message will only scroll 67 at the receiving terminal(s) while the GUI of the terminal-based application will remain hidden. In operation, therefore, a terminal-based application of the present invention may run in the background on a terminal and the received message may scroll 67 unobtrusively across the top of the terminal monitor without interrupting or otherwise intruding with a user who is working at the terminal.

As with the GUI seen in FIG. 4, the scrolling text 67 may be configured in any number of ways using "option" button 68. For instance, when the user clicks on "option" button 68, options to change the scrolling speed of the text 74 and the color of the font 76 are made available. The terminal-based application also may include many additional options (not shown) for configuring the scrolling text, such as changing the type and size of the font. When the user has completed configuring these options, a "done" button 78 is provided which removes these options from view. Additionally, a "clear" button 70 is provided to allow the recipient to quickly clear the message.

As shown in FIG. 7, an "acknowledge" button 71 may be present. "Acknowledge" button 71 allows a user present at a receiving terminal to easily acknowledge receipt of a message. For example, if a user sends a message to 3 terminals or users on the system requesting assistance, an individual seeing that message scrolling can click on "acknowledge" button 71, select that user's name from a drop-down list 73 of registered users, select the message to acknowledge from a drop-down list 75 of messages which are scrolling, and click "acknowledge" button 77 to send the acknowledgement to the sender. By clicking on "done" button 79, a user can hid drop-down list 73, message drop-down list 75, "acknowledge" button 77, and "done" button 79 from view so that they are not in the way when not needed. As stated previously, more than one message may be scrolling 67. The terminal-based application can be configured to define the maximum number of messages which may scroll at one time in order to prevent a confusingly large number of messages from scrolling at one time. As stated above, when a user has acknowledged a received message, that message may or may not be removed from the scroller at other recipient terminals of that message. For instance, the sender may configure the message so that when a user acknowledges the message, the message is not removed from the scroller of other receiving terminals. Alternatively, a user acknowledging the message may select an option (not shown) when acknowledging the message to remove or not to remove the message from the scroller at other receiving terminals. In any case, the message will still appear in the text box 56 of the GUI at all receiving terminals. Desirably, when a normal message is sent to multiple users, terminals, or combinations thereof, when that message is acknowledged at one terminal-based application in the manner set forth above, the message is removed from the scroller of all other terminal-based application at which it has appeared. Desirably, when there are no messages scrolling 67, the scroller is automatically hidden from view.

In another aspect of the present invention, when only one message is scrolling, "acknowledge" button 71 may be clicked to quickly acknowledge receipt of that message without the need for selecting the message from drop-down menu 75. Also, if a particular user is logged into a station, clicking on "acknowledge" button 71 will acknowledge a received message from that individual without the need for that individual to select that users name from drop-down menu 73. In such configurations, "acknowledge" button 71 serves the same function as "acknowledge" button 77, simply providing an easier means to acknowledge received messages. It will be clear that the terminal-based software of the present invention may be configured to acknowledge messages in many different ways.

As stated previously, when a private message is received, the message which scrolls 67 may be one which states that a private message has been received for that user. A button (not shown) may be present in proximity to the scrolling text which the intended recipient may click, thereby prompting the recipient to enter a password, thereby retrieving the private message. Further, a "hide" button 72 is provided which can be clicked on to quickly remove the scrolling text from view.

Figure 9:
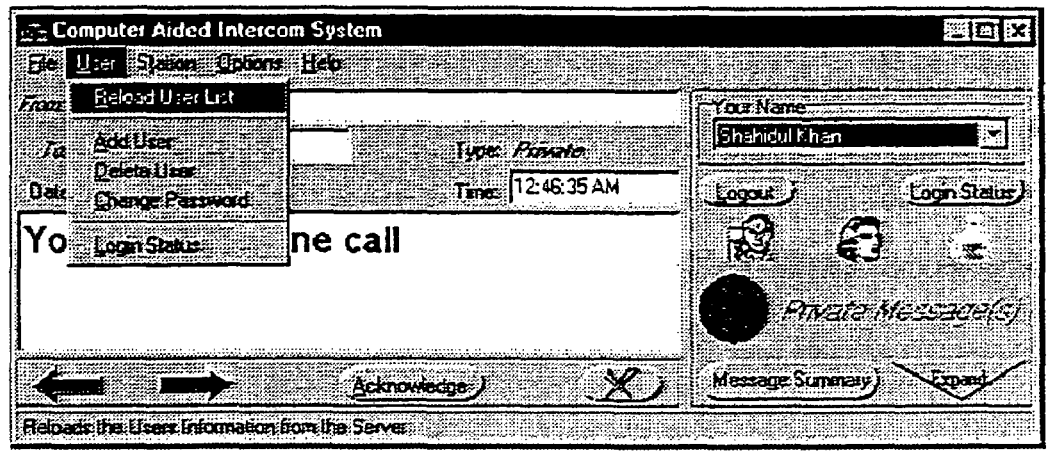
FIG. 9 shows the graphical user interface of FIG. 8 including a user drop-down menu.

A menu bar 66 is also provided as part of the GUI. Menu bars are conventionally found in applications running under standard operating systems. In the present invention, menu bar 66 is capable of numerous functions. These included configuring the terminal-based application, including the assignment of station buttons 42 to specific groups of stations, the appearance of all buttons on the GUI, the type of indicator for private messages, etc. Also included are means for saving a particular message, configuring a profile for the user, and a help menu. FIG. 9 shows the "user" menu on menu bar 66 in a drop-down format. As seen, when the user clicks on the "user" menu, a list of functions appears. By selecting from the listed functions, the user may configure certain aspects of the software such as, for example, reloading a user list, adding a user, deleting a user, changing a password, and obtaining user login status information.

The present invention may also have associated therewith other features which are desirable for communications over an electronic network. For example, a process and system of the present invention may also include the use of video such that users at two or more terminals on the network can communicate visually with each other. In such a system, terminals at which such video communication is desired would have a means, such as a digital video camera, for transmitting real-time video images across the network to the desired receiving terminals. This may occur in a manner as set forth previously for text data communication, desirably by a point-to-point transfer. Additionally, a process and system of the present invention may include speech recognition capabilities. A speech recognition component could be included such that a user could speak into a microphone at that user's terminal and that speech would be converted to text which is then transferred to the intended user(s) and/or terminal(s) in the manner set forth previously. Such a feature is particularly desirable, for example, where a user is capable of speaking significantly faster than typing or where a terminal is not equipped with a keyboard. It is contemplated that terminals in a network could be dedicated exclusively to employing the system of the present invention and, as such, would have a microphone and a mouse as the only input means.

Set forth below are examples illustrating particular aspects of the present invention.

EXAMPLE 1

Figure 11:
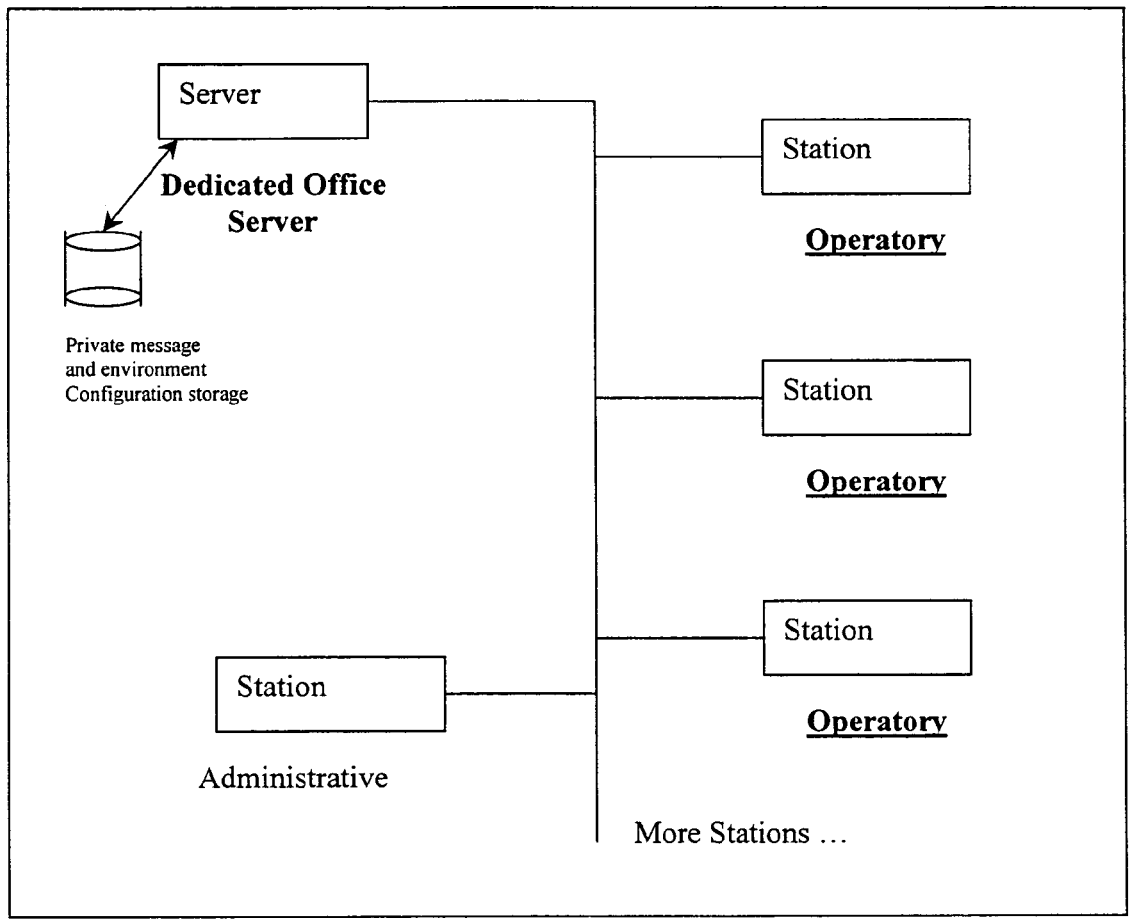
FIG. 11 illustrates the system of the present invention applied to a dental office environment.

FIG. 11 shows how a system of the present invention would be applied in a dental office environment.

EXAMPLE 2

Figure 12:
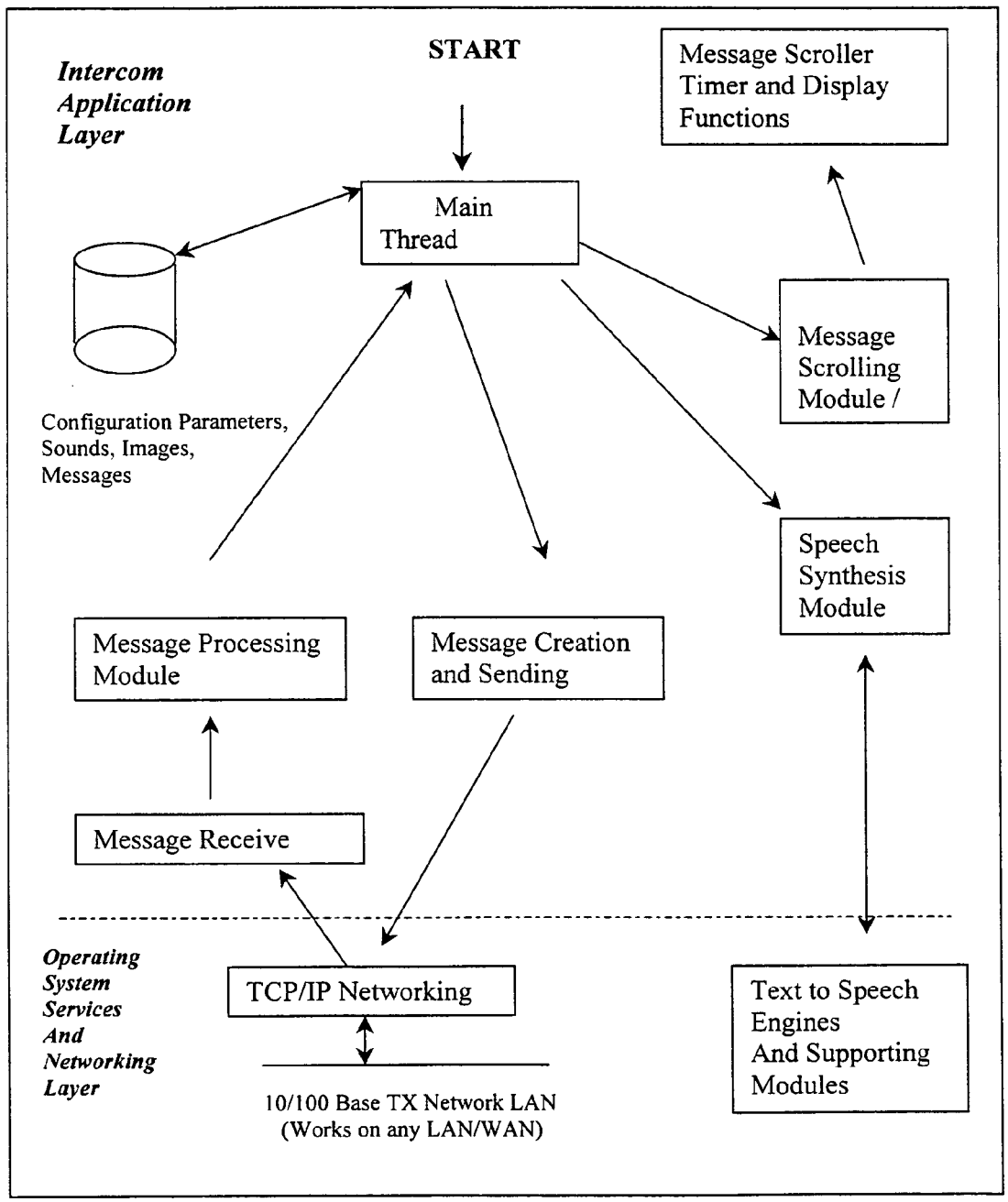
FIG. 12 illustrates the modules present at a station employing the technology of the present invention.

FIG. 12 illustrates the modules present at a station employing the technology of the present invention.

EXAMPLE 3

Message Infrastructure

Message Infrastructure

The intercom client-server design includes a well defined set of inter-station messages. These messages are sent from station to station over the TCP/IP networking layer using client and server socket communication. The application sends and receives messages over a specific TCP/IP service port desirably used only by the system of the present invention. This ensures that the application will not interfere with any other network based applications on the system(s).

These messages are used for all operations of the stations, from initialization, update, and message sending and receiving to and from other stations.

Message Specification and Format

Inter-station message are formatted as follows:

<id1>=<id1 value>; <id2>=<id2 value>; . . . ; <idN>=<idN value>

In this specification, an id (id1, id2, . . . ) is a message primitive tag. These primitives identify different attributes of a message. These attributes are identified as follows:

| Identifier | Description |
| --- | --- |
| Id | Unique message numerical identifier |
| Date | Date of message sent |
| Time | Time of message sent |
| Source | Name of originating station |
| Target | Name of target station |
| From | Name of originating user |
| Sendto | Name of recipient user |
| Cmd | Cmd sent to the target station to process |
| Mnum | Message number or optional parameter |
| Data | Data associated with the message |

Parameters specified with a message being sent are dependent on the command being encoded with the cmd identifier. As shown, there are modules (logical grouping of functions) that are dedicated for processing messages received from other stations and as well as to send messages to other stations. Given an inter-station command and related parameters, these modules encode the information into a message before sending them over the TCP/IP network and decode similar messages received from other stations into identifiable commands and parameters.

The commands implemented at the current time in the system of the present invention are stated below. As more features are added to the applications, more commands and related parameters will be designed and added to the message infrastructure. The basic parameters such as id, date, time, source, . . . will not be listed with each as they are always defined. Only parameters relevant to the commands being described will be listed.

| Command | Description | Parameters |
| --- | --- | --- |
| Ack | Message Received | |
| Ackr | Message Read | Source = machine message was read on |
| | | From = name of user that read message |
| Mack | Message Acknowledged | Source = machine message was acknowledge from |
| | | From = name of user acknowledging the message |
| | | Mnum = machine original message was sent from |
| | | Data = original message |
| Ping | Station Ping | |
| Normmsg | Normal Message | From = originating user |
| | | Source = originating station |
| | | Sendto = intended receiving user |
| | | Mnum = message number |
| | | Data = message |
| Bcastmsg | Broadcast Message | From = originating user |
| | | Source = originating station |
| | | Sendto = intended receiving user (NULL accepted) |
| | | Mnum = message number |
| | | Data = message |
| Logout | User logging out from station | Source = station user logging out from |
| Psend | User sending a private message. | Sendto = intended recipient of message |

-continued

| Command | Description | Parameters |
|---|---|---|
| | Message is rerouted through the server for storage and distribution. | Mnum = target station where to send private message<br>Source = originating station of message<br>Target = server |
| Pnotify | Notification from server of new private message | Sendto = who the private message is for |
| Pget | Retrieve private message | From = user requesting private messages |
| Pdisp | Private message received from the server. Message can be displayed. | Sendto = user private message is for<br>Source = machine sending private message |
| Pdispmult | Multiple private messages are sent | Sendto = user private messages are for<br>Source = machine sending private messages |
| Pdelete | Delete Private Message on Serer | From = user requesting private message deletion<br>Mnum = number of private message of user to delete |
| Getpnum | Get the number of private message for a user | From = who to send the information about |
| Pnum | Number of private messages | From = who the information is about<br>Data = number of private messages |
| Getpsumm | Request to send the private message summary | Source = station requesting the private message summary |
| Psumm | Private message summary | Mnum = total number of private messages<br>Data = private message summary |
| Getuls | Request the user login status | Source = station requesting the user login status |
| Uls | User Login Status | Mnum = number of users logged in<br>Data = user login status |
| Getinit | Request initialization data | |
| Gethosts | Request updated station information | |
| Getcmsgs | Request updated standard messages | |
| Getpbm | Request updated Programmable Broadcast Message button information | |
| Getusers | Requesting updated user information | |
| Datainit | Station Initialization data | Data =<br>Number of systems<br>Station group1 name<br>Station group2 name<br>Station group3 name<br>Station group4 name<br>System name 1<br>System caption 1<br>System name 2<br>System caption 2<br>.<br>.<br>.<br>Number of standard messages<br>Standard message 1<br>Standard message 2<br>.<br>.<br>PBM 1 Enabled (true or false)<br>PBM 1 Caption<br>PBM 1 Message<br>PBM 1 Icon Enabled<br>PBM 2 Enabled (true or false)<br>PBM 2 Caption<br>PBM 2 Message<br>PBM 2 Icon Enabled<br>PBM 3 Enabled (true or false)<br>PBM 3 Caption<br>PBM 3 Message<br>PBM 3 Icon Enabled<br>Number of Users<br>User name 1<br>User password 1<br>User name 2<br>User password 2<br>.<br>.<br>. |
| Dhosts | Host information data | Number of systems<br>Station group1 name<br>Station group2 name<br>Station group3 name<br>Station group4 name<br>System name 1<br>System caption 1<br>System name 2<br>System caption 2<br>.<br>.<br>. |
| Dcmsgs | Standard messages data | Number of standard messages<br>Standard message 1<br>Standard message 2<br>.<br>.<br>. |
| Dpbm | PBM data | PBM 1 Enabled (true or false)<br>PBM 1 Caption<br>PBM 1 Message<br>PBM 1 Icon Enabled<br>PBM 2 Enabled (true or false)<br>PBM 2 Caption<br>PBM 2 Message<br>PBM 2 Icon Enabled<br>PBM 3 Enabled (true or false)<br>PBM 3 Caption<br>PBM 3 Message<br>PBM 3 Icon Enabled |
| Dusers | User data | Number of Users<br>User name 1<br>User password 1<br>User name 2<br>User password 2<br>.<br>.<br>. |

EXAMPLE 4

Message Flow

Message Flow

Below are shown some of the messages being sent between different stations upon some operations being carried out on the stations.

User Login on Station A

Station A sends a getpnum command→to the Server

Server keeps track of user having logged on Station A

Server sends a pnum command→Station A

Station A displays the private message light if user had any private messages.

Station A deletes any private messages in the display list from previous user, if any.

User Sends a Normal Message from Station A to Station B

Station A sends the normal message via a ndisp command→to Station B

Figure 13:
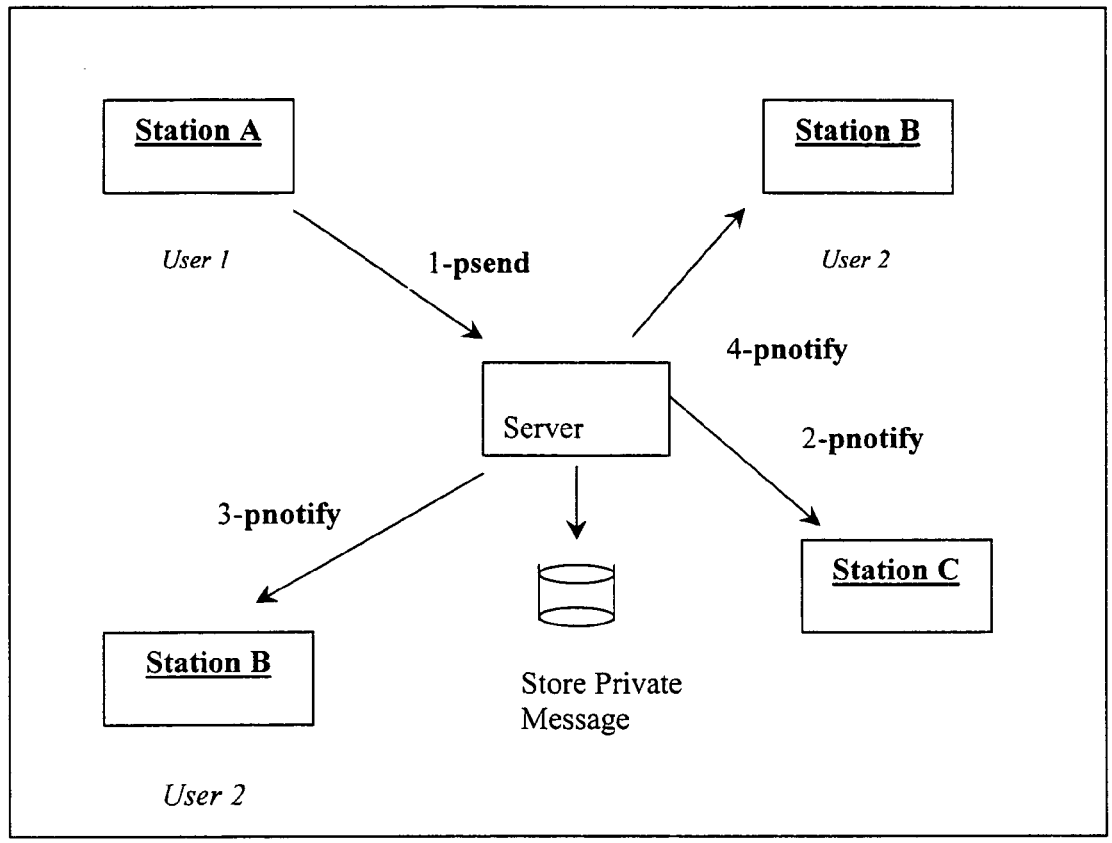
FIG. 13 describes the operation of one aspect of the present invention.

User 1 sends a Private Message from Station A to User 2 on Station C
(User 2 is logged in Station B and D)
This operation is best described with reference to FIG. 13.

Requesting a Login Status on Station B
Station B request a user login status and sends a getuls command→to the Server
Server sends the user login status with the uls command→Station B User Clicks on Second Programmable Broadcast Message on Station B
Station B sends the message with the bcastmsg command→Station A
Station B sends the message with the bcastmsg command→Station C
Station B sends the message with the bcastmsg command→Station D
Station B sends the message with the bcastmsg command→Station E
Station B sends the message with the bcastmsg command→Station F While specific aspects of the invention have been set forth above, it is to be understood that these are in no way meant to be limiting. It should be understood that the present invention encompasses any modification or alternative aspects which fall within the claims set forth.

What is claimed is:

1. A method of communication over a network, said network including a plurality of user accessible stations comprising the steps of:
    providing application software for permitting communication between said stations, said application software including a graphic user interface for indicating communication data transfer at one of said stations, said application software permitting user selectable communication modes;
    establishing a profile of each of said users selectable communication modes and communication data in response to inputs from said user,
    automatically ranking said user selectable communications modes and communication data in accordance with said profile,
displaying said ranking through said graphic user interface at said another station, and
selectively transferring communications data from one of said plurality of stations to another of said plurality of stations directed to at least one of a plurality of users in accordance with said ranking.

2. A method of claim 1 wherein said selecting step includes:
    selecting through said graphic user interface, said communication data in text, audio, video, voice modes or combinations thereof.

3. A method of claim 2, wherein said application software is configured to provide text-to-speech capability and wherein said selecting step further includes:
    selecting through said graphic user interface, said text-to-speech conversion for said communication mode.

4. A method of claim 1 further including:
selecting one or more said users of said network to whom communication is desired.

5. A method of claim 1 further including:
selecting one or more said stations to which communication is desired.

6. A method of claim 1, wherein said transferring step includes:
    entering said communication data at one of said plurality of stations; and
    selecting said one or more said users of said network to whom communication is desired.

7. A method of claim 1, wherein said transferring step includes:
    entering said communication data at one of said plurality of stations; and
    selecting one or more said stations to which communication is desired.

8. A computer communication system for transferring communication data among users on an electronic communication network comprising:
    a communication server
    a plurality of user accessible stations connected to said electronic communication network;
    application software configured to establish a profile for each of said users communication modes and communication data in response to inputs from said user, effect transfer of communication between said user accessible stations and said communication server;
    said application software further including a graphic user interface for indicating communication transfer to at least one said station, said application software further effecting automatic ranking and switching of selective communication modes in accordance with said profile, and said application software further configured to automatically selectively transfer a plurality of messages to one of said stations to at least one of a plurality of users through said selective communication modes.

9. A computer system of claim 8 wherein said communication modes include text, audio, video, voice and combinations thereof.

10. A computer system of claim 9 wherein said application software includes text-to-speech conversion capabilities.

11. A computer system of claim 9 wherein each station supports two-way text, audio, video and voice communication and combinations thereof.

12. A computer system of claim 8 wherein said application software is configured to identify users accessing said user accessible stations.

13. A computer system of claim 12 wherein said application software is configured to permit specific user access at each of said plurality of stations.

14. A computer system of claim 8 further including a communication server connected to said plurality of stations.

15. A computer system of claim 14 wherein said application software includes server-based software configured to effect communication between said plurality of stations and said communication server.

16. A computer system of claim 15 wherein said server-based software is operative to effect communication among said plurality of stations.

17. A computer system of claim 16 wherein said application software includes station-based software configured to effect communication directly between said plurality of stations.

18. A computer system of claim 17 wherein said station-based software is user configurable.

19. A computer system of claim 17 wherein said station-based software includes message indicating capability for providing an indication at said user accessible station of receipt of said communication.

20. A computer system of claim 19 wherein said message indicating capability includes graphic and audio indications and combinations thereof.

21. A computer system of claim 8 wherein said application software is configured to display the currently stored total number and type of messages for each user of the system from any user accessible station.

22. A computer system of claim 8 wherein said application software is configured to dynamically display messages in one of a plurality of visual modes.

23. A computer system of claim 8 wherein said application software is configured to dynamically track and display user log-on and log-out status from any of said user accessible stations independent of said communications server.

24. A computer system of claim 8 wherein said application software is configured to define, store and distribute custom standardized messages for transmission from any of said user accessible stations.

25. A computer system of claim 8 wherein said application software is configured to automatically construct and transmit custom messages to any one of a plurality of user accessible stations upon the occurrence of a predetermined event.

26. A computer system of claim 8 wherein said application software is configured to transmit and display a message to at least one of a plurality of display ports of said application software.

27. A computer system of claim 26 wherein said plurality of display ports include a message receiving window.

28. A computer system of claim 26 wherein said plurality of display ports include a message scrolling banner.

29. A computer system of claim 8 wherein said application software is configured to define and identify said user accessible stations into groups based upon predetermined criteria.

30. The computer systems of claim 29, wherein said predetermined criteria include physical location.

31. The computer systems of claim 29, wherein said predetermined criteria include departmental ownership.

32. A computer system of clam 29 wherein said application software is configured to graphically represent the organizational and physical location of said user accessible stations.

33. A computer system of claim 29 wherein said application software is configured to direct messages to one or more user accessible stations within said groups.

34. A computer system of claim 29 wherein said application software is configured to direct messages to a plurality of said user accessible stations based upon more than one group identity.

35. A computer system of claim 29 wherein said application software is configured to dynamically modify the group status of said user accessible stations.

36. A computer system of claim 8 wherein said application software is configured to dynamically track said users log-in status for all of said user accessible stations within said computer system.

37. A computer system of claim 8 wherein said application software is configured to allow a message recipient to acknowledge a received message from said receiving message window.

38. A computer system of claim 8 wherein said application software is configured to allow a message recipient to acknowledge a received message from said message-scrolling banner.

39. A computer system of claim 8 wherein said application software is configured to assign predetermined properties to a message before transmitting said message.

40. A computer system of claim 39 wherein said predetermined properties control how a message is routed.

41. A computer system of claim 39 wherein said predetermined properties control how a message is stored.

42. A computer system of claim 39 wherein ad predetermined properties control how a message is displayed.

43. A computer system of claim 39 wherein said predetermined properties control how a message is acknowledged.

44. A computer system of claim 39 wherein said predetermined properties control how to reply to said message.

45. A computer system of claim 39 wherein said predetermined properties control how a message is deleted.

46. A computer communication system for communicating among users on an electronic communication network comprising:
 a plurality of user accessible stations connected to said electronic communication network;
 application software configured to effect transfer of communication data between said user accessible stations,
 said application software including a graphic user interface for indicating communication transfer to at least one said user accessible station, and further configured to provide selective communication modes, a profile of said selective communication modes and communication data for each of said users in response to inputs from said user, a ranking of said selective communication modes, and transfer of communication between said user accessible stations based on said ranking, and said application software further configured to allows any of said user accessible stations to dynamically accept the functionality of a communication server.

47. The computer communication system for communicating among users on an electronic communication network in accordance with claim 46, wherein said application software can run as a client, a server or both from any of said user accessible stations.

48. A computer system of claim 46 wherein said communication modes include text, audio, video, voice and combinations thereof.

49. A computer system of claim 46 wherein said application software includes text-to-speech conversion capabilities.

50. A computer system of claim 46 wherein each station supports two-way text audio, video and voice communication and combinations thereof.

51. A computer system of claim 46 wherein said application software is configured to identify users accessing said user accessible stations.

52. A computer system of claim 46 wherein said application software is configured to permit specific user access at each of said plurality of user accessible stations.

53. A computer system of claim 46 further including a communication server connected to said plurality of user accessible stations.

54. A computer system of claim 46 wherein said application software includes server-based software configured to effect communication between said plurality of s user accessible tations and said communication server.

55. A computer system of claim 54 wherein said server-based software is operative to effect communication among said plurality of said user accessible stations.

56. A computer system of claim 55 wherein said application software includes station-based software configured to effect communication directly between said plurality of user accessible stations.

57. A computer system of claim 56 wherein said station-based software is user configurable.

58. A computer system of claim 56 wherein said station-based software includes message indicating capability for providing an indication at said user accessible station of receipt of said communication.

59. A computer system of claim 58 wherein said message indicating capability includes graphic and audio indications and combinations thereof.

* * * * *